United States Patent
Quatannens et al.

(10) Patent No.: US 10,847,823 B2
(45) Date of Patent: Nov. 24, 2020

(54) FUEL CELL STACK INLET FLOW CONTROL

(71) Applicant: FuelCell Energy, Inc., Danbury, CT (US)

(72) Inventors: Michael L. Quatannens, Chappaqua, NY (US); William Snyder, Ossining, NY (US); Quan Jin, Southbury, CT (US); Robert S. Fournier, West Hartford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 144 days.

(21) Appl. No.: 15/724,736

(22) Filed: Oct. 4, 2017

(65) Prior Publication Data
US 2019/0103621 A1    Apr. 4, 2019

(51) Int. Cl.
| H01M 8/04746 | (2016.01) |
| H01M 8/04089 | (2016.01) |
| H01M 8/04082 | (2016.01) |
| H01M 8/0606  | (2016.01) |
| H01M 8/2485  | (2016.01) |
| H01M 8/04007 | (2016.01) |
| B01F 3/02    | (2006.01) |

(Continued)

(52) U.S. Cl.
CPC ........... *H01M 8/04753* (2013.01); *B01F 3/02* (2013.01); *B01F 5/0451* (2013.01); *B01F 5/0456* (2013.01); *B01F 5/0463* (2013.01); *B01F 5/0606* (2013.01); *B01F 5/0648* (2013.01); *B01F 5/0652* (2013.01); *H01M 8/04089* (2013.01); *H01M 8/04104* (2013.01); *H01M 8/04201* (2013.01); *H01M 8/0606* (2013.01); *H01M 8/2485* (2013.01); *H01M 8/04007* (2013.01)

(58) Field of Classification Search
CPC ................................................ H01M 8/04753
See application file for complete search history.

(56) References Cited

U.S. PATENT DOCUMENTS

| 3,923,448 A     | 12/1975 | Guth           |
| 5,001,898 A     | 3/1991  | Holladay       |
| 2010/0323262 A1 | 12/2010 | Palmore et al. |

(Continued)

FOREIGN PATENT DOCUMENTS

| GB | 1 571 213 A | 7/1980 |
| GB | 2 545 001 A | 6/2017 |

OTHER PUBLICATIONS

Definitions15724736 (Year: 2020).*
International Search Report and Written Opinion for PCT/162018/057662 dated Nov. 30, 2018 (14 pages).

*Primary Examiner* — Brian R Ohara
(74) *Attorney, Agent, or Firm* — Foley & Lardner LLP

(57) ABSTRACT

A duct for a fuel cell module includes an upper duct hood having an inlet configured to receive reactant gas from a supply duct, the upper duct hood defining a first tapered portion and a second tapered portion. The duct further includes a lower duct hood fluidly coupled to the upper duct hood, the lower duct hood defining at least one outlet. In a side view, the second tapered portion is tapered inwardly in a downstream direction. In a top view, the first tapered portion is tapered inwardly in a downstream direction, and the second tapered portion is tapered outwardly moving downstream.

12 Claims, 10 Drawing Sheets

(51) Int. Cl.
*B01F 5/04* (2006.01)
*B01F 5/06* (2006.01)

(56) References Cited

U.S. PATENT DOCUMENTS

| | | | |
|---|---|---|---|
| 2012/0328969 A1* | 12/2012 | DeWald | H01M 8/04082 |
| | | | 429/455 |
| 2014/0141710 A1 | 5/2014 | Turrini-Rochford et al. | |
| 2017/0244119 A1 | 8/2017 | Koyama et al. | |

* cited by examiner

FUEL CELL STACK INLET FLOW CONTROL

BACKGROUND

The present application relates to feeding and mixing multiple streams of gas of different temperatures and constituents to a fuel cell module having multiple fuel cell stacks. In particular, the present application relates to an inlet duct for improved mixing and distribution of the multiple incoming gases to each fuel cell stack.

The life of a fuel cell stack largely depends on the degradation rate of the cells within the stack that degrade the most rapidly. Uneven degradation results in shortened fuel cell lifecycles, thereby increasing costs.

SUMMARY

Different rates of degradation between fuel cells can be minimized by subjecting each of the cells to uniform inlet and outlet flow rates, uniform input gas temperatures and uniform mixtures of gas constituent species. These and other advantages may be obtained using the exemplary embodiments disclosed herein.

An exemplary embodiment relates to a duct for a fuel cell module, including an upper duct hood having an inlet configured to receive fuel from a fuel source, the upper duct hood defining a first tapered portion and a second tapered portion. The duct further includes a lower duct hood fluidly coupled to the upper duct hood, the lower duct hood defining at least one outlet. In a side view, the second tapered portion is tapered inwardly in a downstream direction. In a top view, the first tapered portion is tapered inwardly in a downstream direction, and the second tapered portion is tapered outwardly moving downstream.

Another exemplary embodiment relates to a fuel cell module, including a plurality of fuel cell stacks, each fuel cell stack defining an inlet configured to receive a gas mixture, and a duct having an upper duct hood and a lower duct hood, the lower duct hood including at least one outlet. The at least one outlet of the lower duct hood is fluidly coupled to a corresponding inlet of a corresponding fuel cell stack, and at least one plurality of vanes is pivotably coupled to opposing sides of the outlet, the at least one plurality of vanes configured to direct the flow of the gas mixture to the inlet.

Another exemplary embodiment relates to a method of mixing fuel for a fuel cell, including receiving a flow of reactant gas in a first end of a duct, receiving air in an inlet of a sparger assembly, outputting air from the sparger assembly at an angle relative to the flow of reactant gas in the first duct, mixing the air from the sparger and the flow of reactant gas to form a gas mixture, and outputting, from an outlet of the duct, the gas mixture having a substantially uniform temperature and a substantially uniform constituent gas species.

DETAILED DESCRIPTION

Due to practical limitations in eliminating sources of variability (e.g., manufacturing variability) within fuel cell systems and fuel cell components, it may be important to provide the ability to make adjustments to the distribution of flow, temperature, and gas constituent species throughout the operating life of a fuel cell stack. That is, if certain fuel cells in a stack degrade at a faster rate than others, it may be useful to provide inlet flows that promote a decrease in the degradation rate of those particular fuel cells. The inlet duct may be configured to generate focused areas in a fuel cell stack with modified conditions that slow local degradation.

The size of a fuel cell system and competing practical requirements, such as operation limits, maintenance requirements, and design for manufacturing limit the available solutions to reducing fuel cell degradation. Therefore, efficient use of space and available energy in the fuel cell system is required. Different inlet duct geometry and assembly methods may improve such access to the fuel cells.

Referring generally to the figures, disclosed herein is a fuel cell module having an inlet duct capable of effectively mixing inlet gases to provide a consistent temperature and gas species mixture to a plurality of fuel cell stacks.

Figure 1:
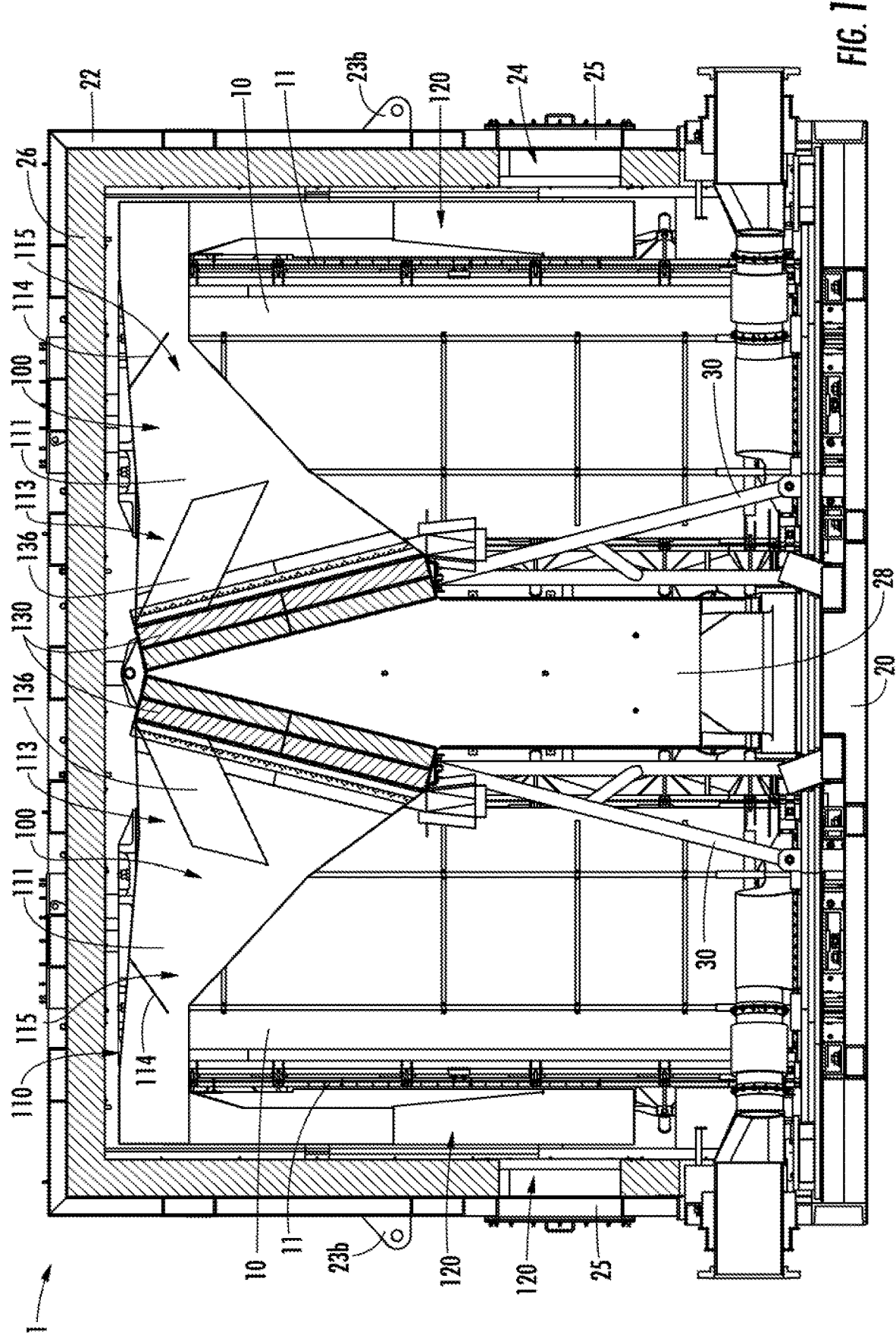
FIG. 1 is a front cross-sectional view of a fuel cell module, according to an exemplary embodiment.
Figure 2:
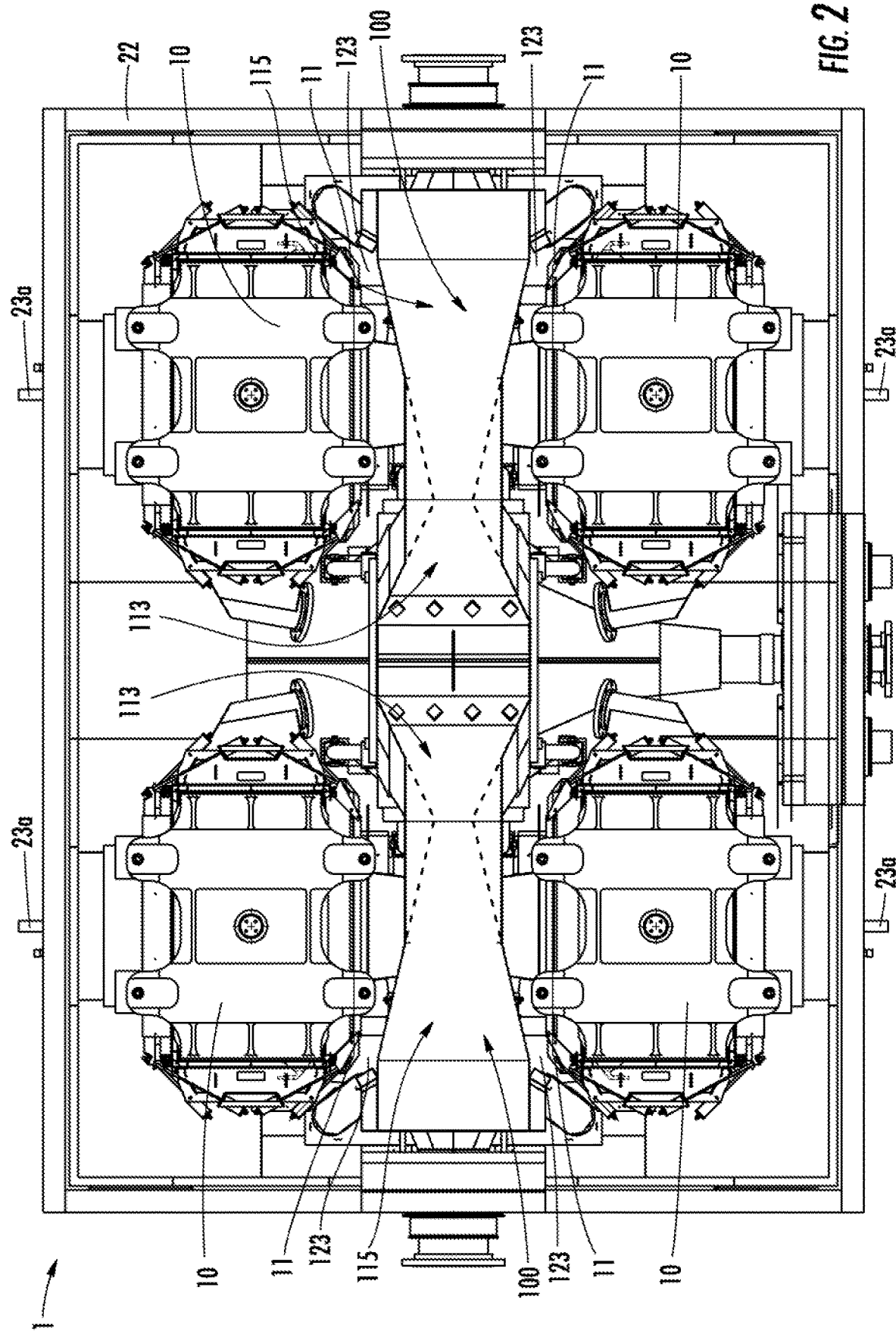
FIG. 2 is a top plan view of the fuel cell module of FIG. 1.
Figure 3:
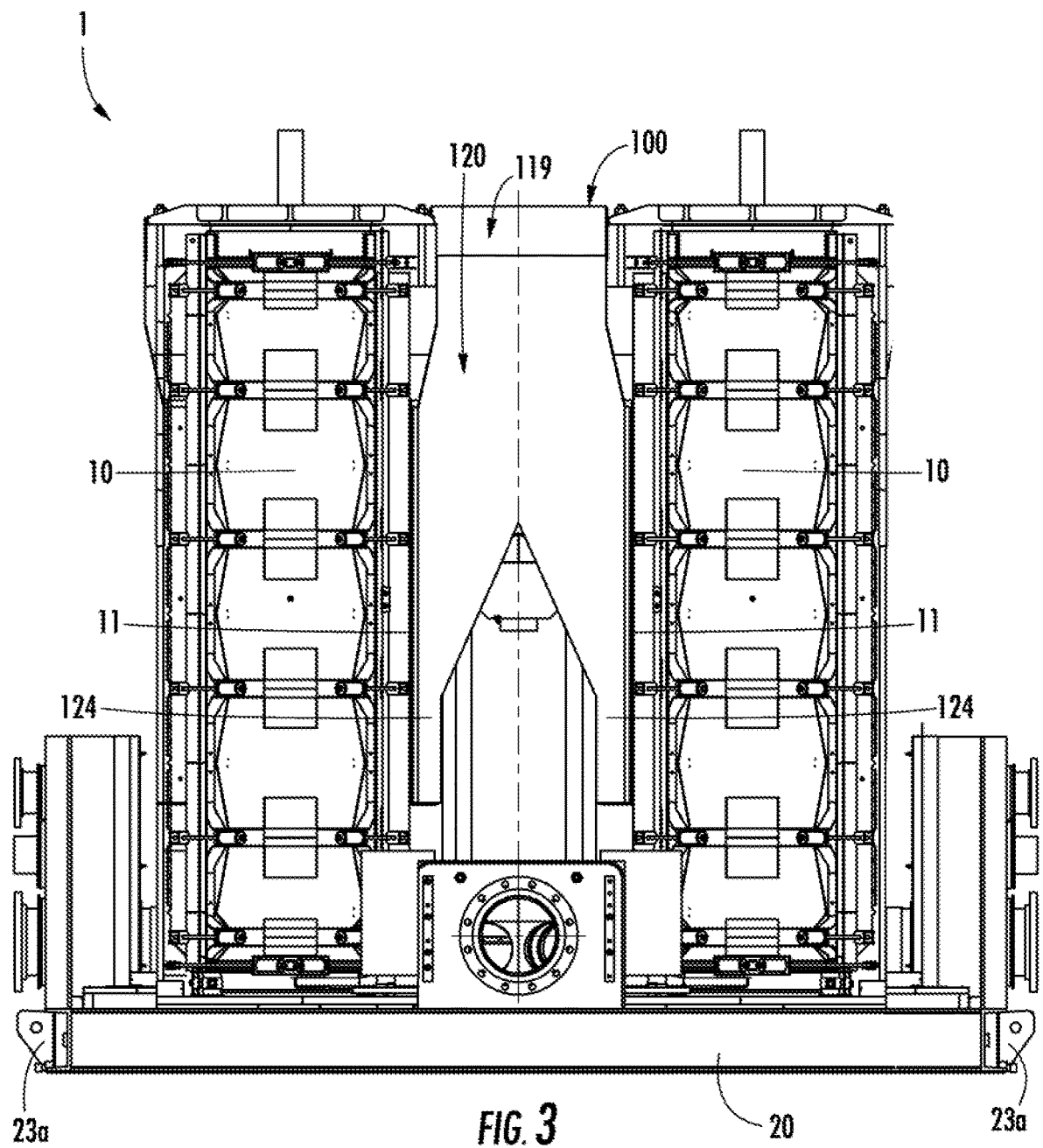
FIG. 3 is a side elevation view of the fuel cell module of FIG. 1.

Referring to FIGS. 1-3, a fuel cell module 1 is shown in accordance with the principles of the present application. The module 1 includes a plurality of fuel cell stacks 10, each fuel cell stack 10 defining an inlet 11. As shown in FIG. 1, the inlet 11 may be an elongated slot (i.e., opening, notch, aperture, etc.). According to other exemplary embodiments, the inlet 11 may include other shapes. As shown in FIG. 1, the inlet 11 is positioned at an outer periphery (e.g., at a corner) of the fuel cell stack 10 and is oriented substantially vertically along the fuel cell stack 10. According to other exemplary embodiments, the inlet 11 may be located at other positions and in other orientations in the fuel cell stack 10.

A fuel cell stack 10 includes one or more fuel cells, each fuel cell having an anode and a cathode. According to an exemplary embodiment, the module 1 includes four fuel cell stacks 10. According to other exemplary embodiments, the module 1 may include more or fewer fuel cell stacks 10.

As shown in FIG. 1, the module 1 defines a base 20, configured to support various components within the module 1, and a shell 22. For example, the base 20 forms a generally planar surface configured for coupling fuel cell stacks 10 and ducts 100 thereto. The fuel cell stacks 10 and ducts 100 may be removably coupled (e.g., bolted, screwed, etc.) to the base 20. According to other exemplary embodiments, the fuel cell stacks 10 and ducts 100 may be permanently joined (e.g., welded, riveted, etc.) to the base 20. As shown in FIG. 1, the ducts 100 may be joined to the base 20 with a brace 30. A brace 30 supports at least a portion of the weight of each duct 100. The base may be reinforced to provide additional structural rigidity to the module 1. The base 20 may further include at least one lifting bracket (i.e., flange) 23*a*. As shown in FIGS. 2 and 3, the base 20 includes four lifting brackets 23*a*, although more or fewer lifting brackets 23*a* may be used, according to other exemplary embodiments. The lifting brackets 23*a* are configured to support the weight of the entire module 1, such that the module 1 may be lifted and moved by engaging the base 20.

The shell 22 forms a box shape around the components within the module 1. According to an exemplary embodiment, the shell is disposed in close proximity to the fuel cell stacks 10 and ducts 100, minimizing the space therebetween. This configuration maximizes space utilization within a compact module 1. The shell 22 may be removably coupled (e.g., bolted, screwed, etc.) to the base 20. The shell 22 may include at least one lifting bracket 23*b*. The shell 23*b* includes four lifting brackets 23*b*, although more or fewer lifting brackets 23*b* may be used according to other exemplary embodiments. In this configuration, the lifting brackets 23*b* are configured to support the weight of the shell 22, such that the shell 22 may be removed from or placed on the base 1, providing better access to an interior of the module 1 and simplifying manufacturing of the module 1. According to another exemplary embodiment, the lifting brackets 23*b* are configured to support the weight of the entire module 1, such that the module 1 may be lifted and moved by engaging the shell 22. According to another exemplary embodiment, the shell 22 is permanently joined (e.g., welded, riveted, etc.) to the base 20.

The shell 22 defines an opening 24 configured to provide access to an area inside the shell 22 for maintenance of the module 1. According to an exemplary embodiment, the shell 22 defines two openings 24 in opposing sides of the shell 22. According to another exemplary embodiment, more of fewer openings 24 may be provided in the shell 22. The opening 24 may be round and large enough for a person to pass therethrough. According to other exemplary embodiments, the opening 24 may be other shapes (e.g., rectangular, hexagonal, etc.) or sizes. As shown in FIG. 1, the opening 24 is configured to receive a cover 25. The cover 25 may sealingly engage the opening 24 in order to prevent gas from being released from the module 1 through the openings 24. The module 1 further includes a layer of insulation 26 disposed on an inner surface of the shell 22. The insulation 26 is configured to reduce the transfer of heat between the module 1 and the surroundings outside the shell 1. According to an exemplary embodiment, the insulation 26 is between 5 and 10 inches thick, and preferably approximately 7 inches thick. According to an exemplary embodiment, the innermost surface of either the shell 22 or the insulation 26 may be offset between 1 and 5 inches from at least a portion of one of the fuel cell stack 10 and the duct 100, and preferably offset approximately between 2 and 3 inches therefrom.

The duct 100 is shown in the module 1 in FIGS. 1-3. The duct 100 is configured to receive a reactant gas (e.g., fuel, a gas mixture of oxidized fuel cell exhaust and air, etc.) from a supply duct 28 (e.g., a fuel supply, an anode gas oxidizer system) for feeding the gas mixture to the fuel cell stacks 10. In the supply duct 28, exhaust gas from the fuel cell stacks 10 may be mixed with fresh air and fuel for oxidization, forming the reactant gas with a high level of $CO_2$, high level of moisture, and high temperature. The supply duct 28 provides gases that are not thoroughly mixed (e.g., in temperature, composition, etc.). The duct 100 may be configured to further mix the gases. The duct 100 is shown in further detail in FIGS. 4-7, as discussed below.

The duct 100 includes an upper (i.e., first) duct hood 110 fluidly coupled to a lower (i.e., second) duct hood 120. In this application, "fluidly coupled" means that elements are coupled in a fluid conducting manner. According to an exemplary embodiment, the upper duct hood 110 and the lower duct hood 120 are separately formed and joined (e.g., bolted, welded, screwed, riveted, etc.). According to another exemplary embodiment, the upper duct hood 110 and the lower duct hood 120 are integrally formed. The upper duct hood 110 defines a body 111 having an inlet 112 at a first end 111*a* and a transition region 119 at an opposing second end 111*b*, downstream from the first end 111*a*. The inlet 112 of the upper duct hood 110 is fluidly coupled to the supply duct 28 and is configured to receive the reactant gas therefrom. According to an exemplary embodiment, proximate the transition region 119, the upper duct hood 110 is oriented substantially horizontally and the lower duct hood 120 is oriented substantially vertically. The transition region 119 is configured to redirect reactant gas and other gases flowing in the upper duct hood 110 in a generally horizontal direction, to a generally vertical direction in the lower duct hood 120.

In a conventional fuel cell module, the space between two adjacent fuel cell stacks 10 would not be utilized. As shown in FIGS. 2 and 3, according to an exemplary embodiment, for each duct 100, the body 111 extends between at least two adjacent fuel cell stacks 10. As shown in FIG. 1, the body 111 may be disposed at an upper portion of the module 1 such that a maintenance worker may traverse (e.g., stand, walk, crawl, etc.) below the body 111. This position of the body 111 further improves the access to the fuel cell stacks 10 within the module 1.

The body 111 has an elongated length to promote better mixing of the reactant gas with air and/or other gases. The body 111 may be substantially the length of a fuel cell stack 10. For example, the body 111 may be between approximately 4 and 6 feet long. A longer length provides more space and duration for the constituent gas species to mix. The body 111 has a generally rectangular cross section. According to other exemplary embodiments, the body 111 may have a cross section having other shapes (e.g., round, hexagonal, etc.). According to another exemplary embodiment, the body 111 may be generally circular and configured to generate a circular mixing motion. In this configuration, the reactant gas may be received at an outer periphery of the body 111, spiraling inwardly in the body 111 toward a centrally-positioned outlet. According to yet another exemplary embodiment, the reactant gas may be received at a centrally-positioned inlet, spiraling outwardly in the body toward an outlet at an outer periphery.

Figure 4:
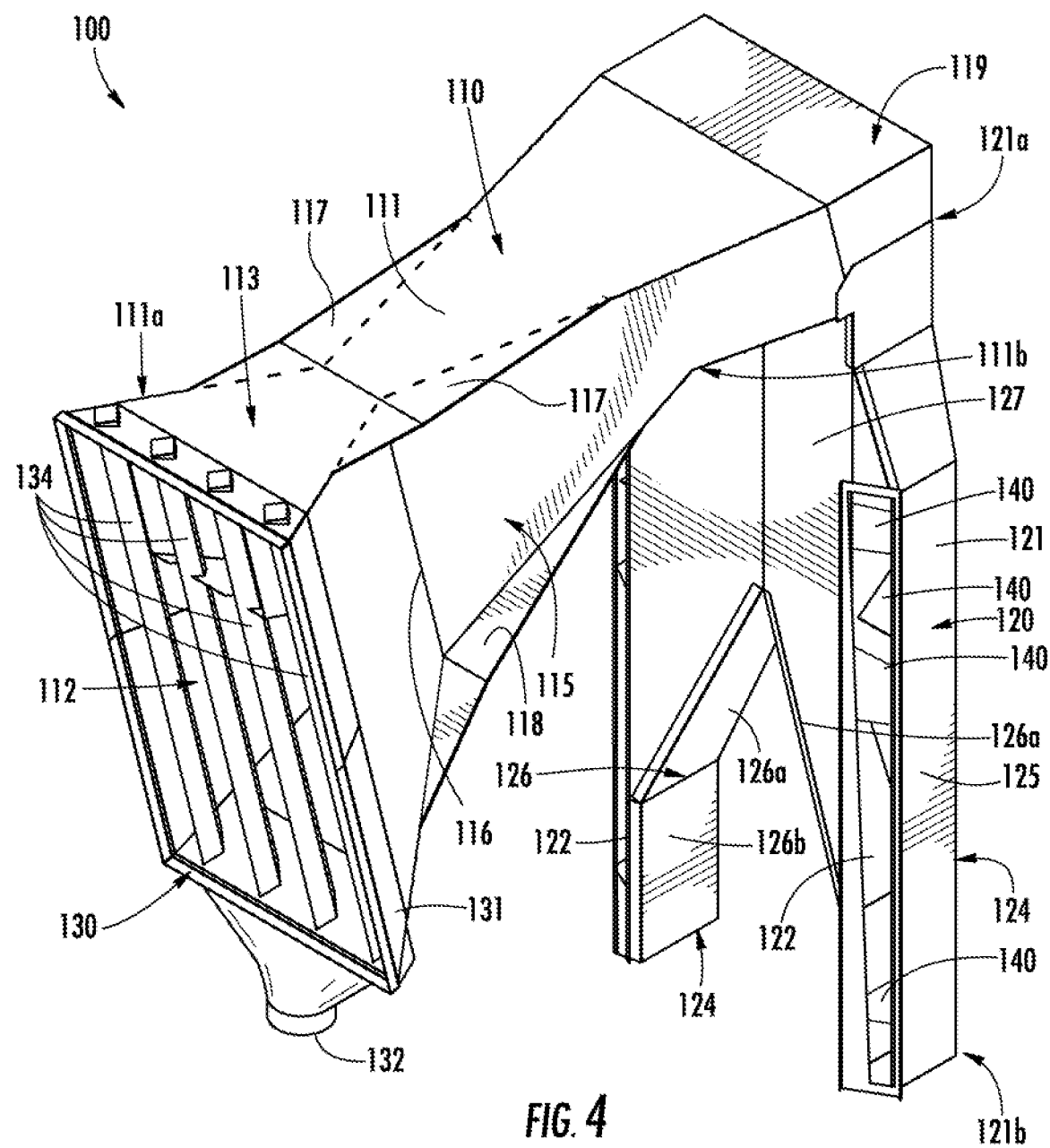
FIG. 4 is a top, front, left perspective view of a duct, according to an exemplary embodiment.
Figure 6:
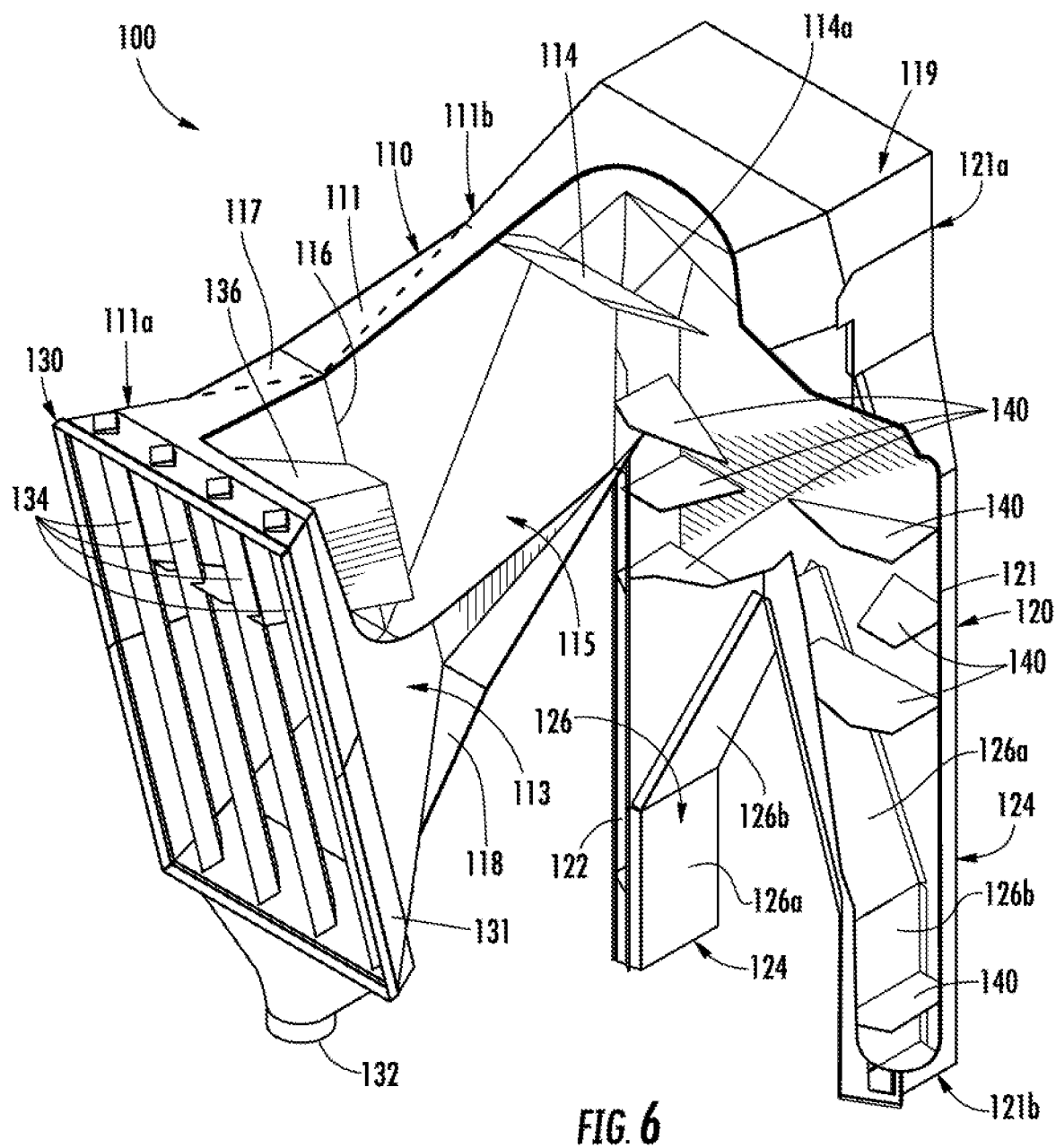
FIG. 6 is a broken-away view of the duct of FIG. 4.

The body 111 is tapered generally inward to form a desired cross-sectional area as a gas mixture of at least reactant gas and air moves downstream therein. The body 111 defines at least a first tapered portion 113 and a second tapered portion 115 downstream from the first tapered portion 113. As shown in FIGS. 4 and 6, the body 111 is gradually tapered inward in a first (e.g., vertical) direction, when viewed from the side (e.g., as shown in FIG. 1), from the first end 111*a* to the second end 111*b* (e.g., moving downstream). According to an exemplary embodiment, laterally-extending portions (e.g., top and/or bottom surfaces) forming the upper duct hood 110 define inwardly tapered surfaces. According to another exemplary embodiment, the taper spans both the first tapered portion 113 and the second tapered portion 115. A taper transition 116 is defined between the first end 111*a* and the second end 111*b* where the first tapered portion 113 and second tapered portion 115 intersect. The vertical inward taper causes the cross-sectional area of the body 111 is configured to decrease as the reactant gas moves downstream in the first tapered portion 113 from the first end 111a to the taper transition 116.

Referring still to FIGS. 4 and 6, the body 111 is gradually tapered inward in a second (e.g., horizontal, lateral, etc.) direction, when viewed from the top (e.g., as shown in FIG. 2), from the first end 111a to the taper transition 116 (e.g., moving downstream). According to an exemplary embodiment, vertically-extending portions (e.g., side surfaces) forming the upper duct hood 110 define inwardly tapered surfaces. As discussed above with respect to the vertical taper, the horizontal inward taper causes the cross-sectional area of the body 111 is configured to decrease as the reactant gas moves downstream in the first tapered portion 113 from the first end 111a to the taper transition 116. The horizontal inward taper in the first tapered portion 113 counteracts non-uniformity present laterally across the flow from the inlet 112 by compressing and forcing the reactant gas and other gases (e.g., air) closer together.

In the second tapered portion 115, the body 111 is gradually tapered outward in the second (e.g., horizontal, lateral, etc.) direction, when viewed from the top (e.g., as shown in FIG. 2), moving downstream from the taper transition 116 to the second end 111b. According to an exemplary embodiment, vertically-extending portions (e.g., side surfaces) forming the upper duct hood 110 define outwardly tapered surfaces. According to another exemplary embodiment, the second direction is substantially perpendicular to the first direction. The degree of taper in each direction may be determined based on a desired cross-sectional area of the body 111 to promote gas mixing in the duct 100. According to an exemplary embodiment, the cross-sectional area of the body 111 is substantially constant in the second tapered portion 115.

Figure 5:
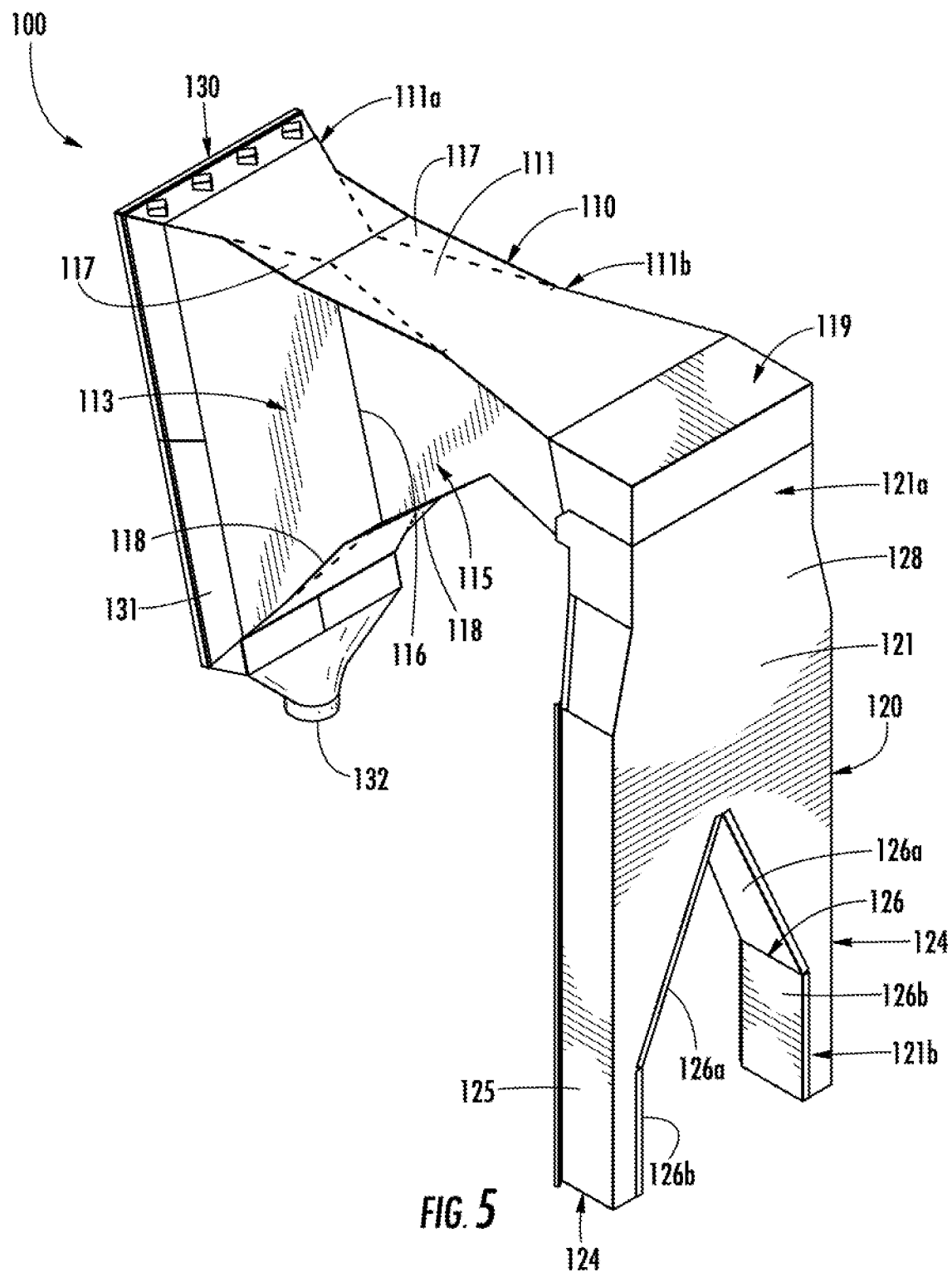
FIG. 5 is a top, front, rear perspective view of the duct of FIG. 4.

As shown in FIGS. 4 and 5 the duct hood 110 includes a plurality of flanges (e.g., wings, ribs, etc.) 117, 118 extending outward from the body 111 for providing structural rigidity to the body 111. The plurality of flanges includes upper flanges 117 extending laterally outward from the body 111 proximate the taper transition 116 at the top surface of the body 111 (e.g., coplanar with the top surface). Similarly, the plurality of flanges includes lower flanges 118 extending laterally outward from the body 111 proximate the taper transition 116 at the bottom surface of the body 111 (e.g., coplanar with the bottom surface). Structural rigidity in the duct hood 110 may be weakest at a portion with a smaller cross-sectional area (e.g., where the first tapered portion 113 and the second tapered portion 115 are joined), such that the upper and lower flanges 117, 118 provide torsional rigidity about an axis extending vertically through the taper transition 116. The upper and lower flanges 117, 118 may be integrally formed with the top and bottom surfaces, respectively, or may be separately formed from the body 111 and coupled thereto. For example, the upper and lower flanges 117, 118 may be coupled to the body 111 with a tab and slot configuration, such that one of the body 111 or the upper and lower flanges 117, 118 includes a plurality of tabs and the other includes a plurality of slots configured to receive the plurality of tabs.

Each duct 100 may further include a sparger assembly 130. As shown in FIGS. 4-7, the sparger assembly 130 is disposed at the first end 111a of the body 111. According to an exemplary embodiment, the sparger assembly 130 overlaps the body 111 at the first end 111a. The sparger assembly may have a width of approximately 2 feet and a height of approximately 4 feet. According to another exemplary embodiment, the sparger assembly may have other shapes and dimensions. According to another exemplary embodiment, the brace 30 is coupled to the sparger assembly 130, such that the sparger assembly 130 is configured to support at least a portion of the weight of the duct 100. The sparger assembly 130 may be removably coupled (e.g., bolted, screwed, etc.) to the first end 111a of the body 111. According to other exemplary embodiments, the sparger assembly 130 may be permanently joined (e.g., welded, riveted, etc.) to body 111. The sparger assembly 130 may be separately formed from a thicker material than the material forming the duct 100. For example, the sparger assembly 130 may be formed from a material approximately 0.075 inches thick. The thickness of the material for the sparger assembly 130 may be determined based on an anticipated stress applied to the sparger assembly 130 during either production or use of the sparger assembly 130. According to an exemplary embodiment, the sparger assembly 130 is subjected to higher stress than the body 111. The body 111 may be formed from a material thinner than that of the sparger assembly 130. For example, the body 111 may be formed from a material approximately 0.035 inches thick. By using a thinner material in forming the body 111, the weight and material cost of producing the duct may be reduced. According to another exemplary embodiment, the sparger assembly 130 and the body 111 may be formed from materials having the same thickness.

The sparger assembly 130 includes a frame 131 configured to engage the inlet 112 of the body 111. Accordingly to an exemplary embodiment, the shape of the frame 131 may complement the shape of the inlet 112 to form a sealed engagement therebetween. As shown in FIG. 1, the frame 131 is disposed between the first end 111a of the body 111 and the supply duct 28 and may sealingly engage each of the body 111 and the supply duct 28 to prevent or limit leakage of reactant gas from the supply duct 28 into the module 1. The frame 131 defines an opening configured to allow the reactant gas to pass from the supply duct 28, through the frame 131, and into the body 111 at the inlet 112. The sparger assembly 130 further includes an inlet 132 configured to receive air from an air supply (not shown), and a plurality of spargers 134 fluidly connected to the inlet 132. The introduction of air through the spargers 134 into the reactant gas cools the reactant gas while forming the gas mixture, described above. The spargers 134 are each configured to sparge (i.e., bubble) the air received in the inlet 132. As shown in FIGS. 4 and 6, the sparger assembly 130 is shown with four spargers 134, although more or fewer spargers 134 may be used.

Figure 7:
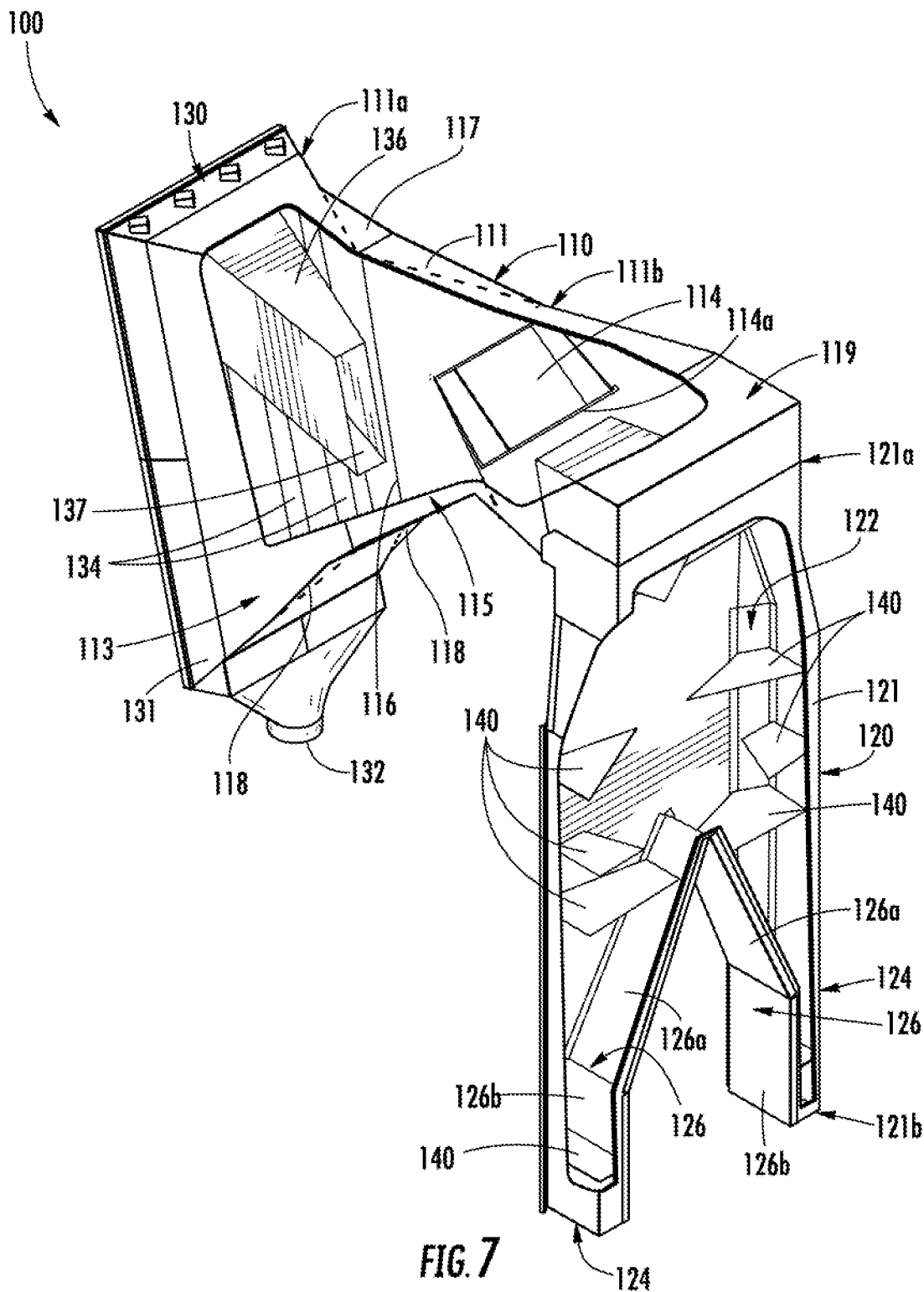
FIG. 7 is a broken-away view of the duct of FIG. 5.

As shown in FIGS. 6 and 7, the sparger assembly 130 further includes at least one secondary duct 136, which receives the air from the spargers 134 and outputs the air from a secondary duct outlet 137 into the body 111 of the duct 100. According to an exemplary embodiment, the secondary duct outlet 137 is angled relative to a cross-section of the body 111 such that the air is output from the secondary duct 136 in a direction angularly offset from the direction of the flow of the reactant gas received in the inlet 112 of the duct 100. According to another exemplary embodiment, the secondary duct 136 is angled both vertically (e.g., downward) and horizontally from the frame 131 of the sparger assembly 130, such that the air output from the secondary duct outlet 137 flows in a direction angularly offset both vertically and horizontally from the flow of the reactant gas received in the inlet of the body 111. This configuration causes the air to mix with the reactant gas received in the inlet 112 and cause a combined gas mixture of air and the reactant gas to generate a vortex mixing motion, further mixing the fuel and the air.

At least one mixing baffle 114 is disposed in the body 111 downstream from the secondary duct 136. The baffle 114 is configured to promote cross-mixing of the reactant gas and the air. The cross-mixing is configured to improve the uniformity of at least temperature and the distribution of gas constituent species in the gas mixture. As shown in FIG. 1, the baffle 114 may be coupled to an upper surface of the body, with a downstream end 114a projecting into (i.e., angularly away from) the body 111, the baffle 114 promoting a downward motion of the gas mixture. According to other exemplary embodiments, the baffle 114 may be disposed in other locations in the body 111. According to other exemplary embodiments, the body 111 may include more than one baffle 114. For example, each baffle 114 in the body 111 may be disposed on the same or different surfaces of the body 111 and may project into the body 111 at the same or different angles. The baffle 114 may be perforated to allow at least some gas or air to pass therethrough.

The lower duct hood 120 defines a body 121 having a first end 121a proximate to the transition region 119 and an opposing second end 121b. The body 121 of the lower duct hood 120 may be formed from the same or different material as the body 111 of the upper duct hood 110. For example, each body 111, 121 may have the same or different thickness. The body 121 is tapered generally outward (e.g., horizontally) and is configured to spread the gas mixture between separate fuel cell stacks 10 downstream from the body 121. The body 121 may further include a plurality of legs 124. As shown in FIGS. 4-7, the body 121 includes two legs 124, although more or fewer legs 124 may be included. According to an exemplary embodiment, the number of legs 124 in all of the ducts 100 in the module 1 may be configured to match the number of fuel cell stacks 10. Each leg 124 defines at least one outlet 122, wherein each outlet 122 is configured to fluidly couple to at least one fuel cell stack 10. As shown in FIGS. 4 and 5, each leg 124 includes one outlet 122 and, as shown in FIG. 2, is configured to fluidly couple to one corresponding fuel cell stack 10. According to an exemplary embodiment, each leg 124 may include more than one outlet 122, wherein each outlet is configured to fluidly couple to one fuel cell stack 10, such that each leg 124 is configured to feed the gas mixture to more than one fuel cell stack 10.

Referring to FIGS. 4 and 5, each leg 124 defines a substantially vertical outer wall 125 and an inner wall 126 having an upper portion 126a and a lower portion 126b. The lower portion 126b may be substantially vertical and offset from the outer wall 125 and/or a lower portion 126b of an inner wall 126 of another leg 124. The upper portion 126a may extend on an angle from and end of the lower portion 126b toward an interior location of the body 121. The upper portions 126b of two corresponding legs 124 may be joined at an upper edge, forming an opening (e.g., passageway, aperture, etc.) defined by the inner walls 126 of the two legs 124. According to an exemplary embodiment, the cross-sectional area of each leg 124 decreases moving downstream, thereby increasing the resistance applied to the gas mixture. According to other exemplary embodiments, the inner and outer walls 125, 126 may have other configurations.

Referring now to FIGS. 1 and 3, the lower duct hood 120 may be disposed proximate to the shell 22. Preferably, the lower duct hood 120 may be disposed proximate to the opening 24. As shown in FIG. 3, the legs 124 are spaced apart such that a person may pass therethrough to access a location further in the module 1. For example, to access the interior of the module 1, the person may pass through the opening 24 and through the space defined between the legs 124 and the base 20.

The body 121 further defines a front face 127 and a rear face 128, opposing the front face 127. According to an exemplary embodiment, the outlets 122 may be disposed at an intersection of each outer wall 125 and the front face 127. The outlets 122 may be formed on an angle therebetween, for example, forming a chamfered edge. The outlets 122 may be elongated, extending along substantially the entire height of the outer wall 125. According to an exemplary embodiment, each outlet 122 may have substantially the same height as an inlet 11 of a corresponding fuel cell stack 10.

As shown in FIG. 2, each outlet 122 is proximate to a corresponding fuel cell stack 10 (e.g., at a corner of the fuel cell stack 10), but does not touch the fuel cell stack 10. According to an exemplary embodiment, the fuel cell stack 10 may be charged and the duct 100 may be grounded. Accordingly, a gap 123 is provided between the outlet 122 and the fuel cell stack 10. The gap 123 may be minimized while still being configured to provide an electrical clearance due to an electrical potential difference between the duct 100 and the fuel cell stack 10. For example, the gap 123 is approximately one inch.

In a conventional fuel cell module 1, the gas mixture would be passed around a fuel cell stack, but not fed directly to the stack. By feeding the gas mixture substantially directly to a fuel cell stack 10 with a minimal gap 123 between the outlet 122 and the fuel cell stack 10, heat loss may be limited. For example, a portion (e.g., 5-10%) of the gas mixture may escape through the gap 123 into the rest of the module 1 rather than being fed substantially directly to the fuel cell stack 10. This portion may flow within the module 1 and is eventually fed into the fuel cell stack 10. By reducing the portion of mixed gas that flows freely in the module 1, the gas constituent species within the gas mixture being fed to the fuel cell stack 10 may be controlled better. For example, better control may improve temperature and composition of the ag mixture fed to the fuel cell stack 10, reducing uneven degradation thereof.

As shown in FIGS. 4, 6, and 7, each leg 124 includes a plurality of output baffles 140 configured to distribute the flow of the gas mixture through the lower duct hood 120. The baffles 140 may be sized and positioned such that the gas mixture is distributed at a substantially uniform flow rate across the height of each outlet 122. The output baffles 140 may vary in size corresponding with the placement within each leg 124. According to an exemplary embodiment, at least some of the output baffles 126 are perforated.

Figure 8:
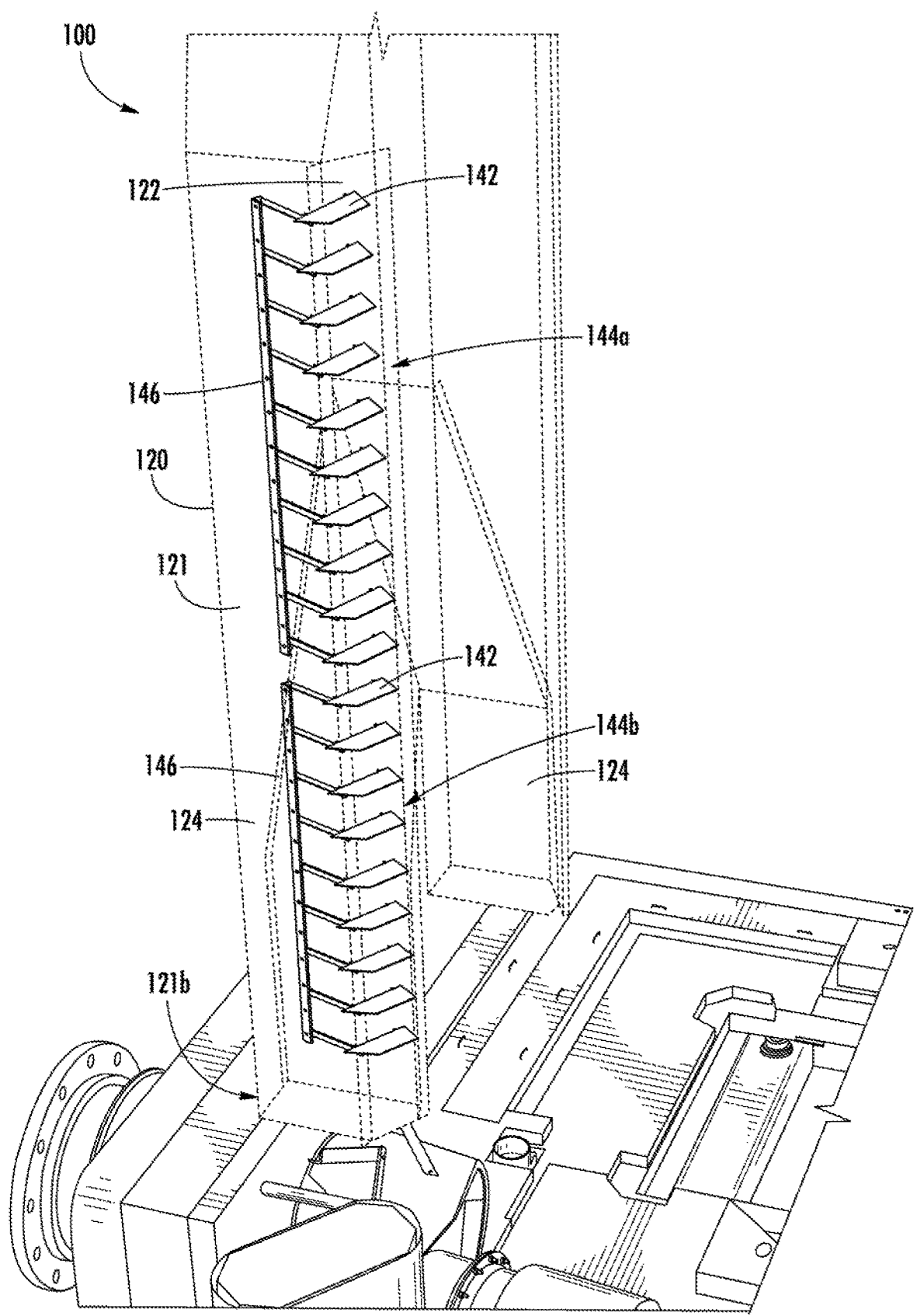
FIG. 8 is a partial perspective view of the lower duct hood have first and second pluralities of vanes, according to an exemplary embodiment.
Figure 9:
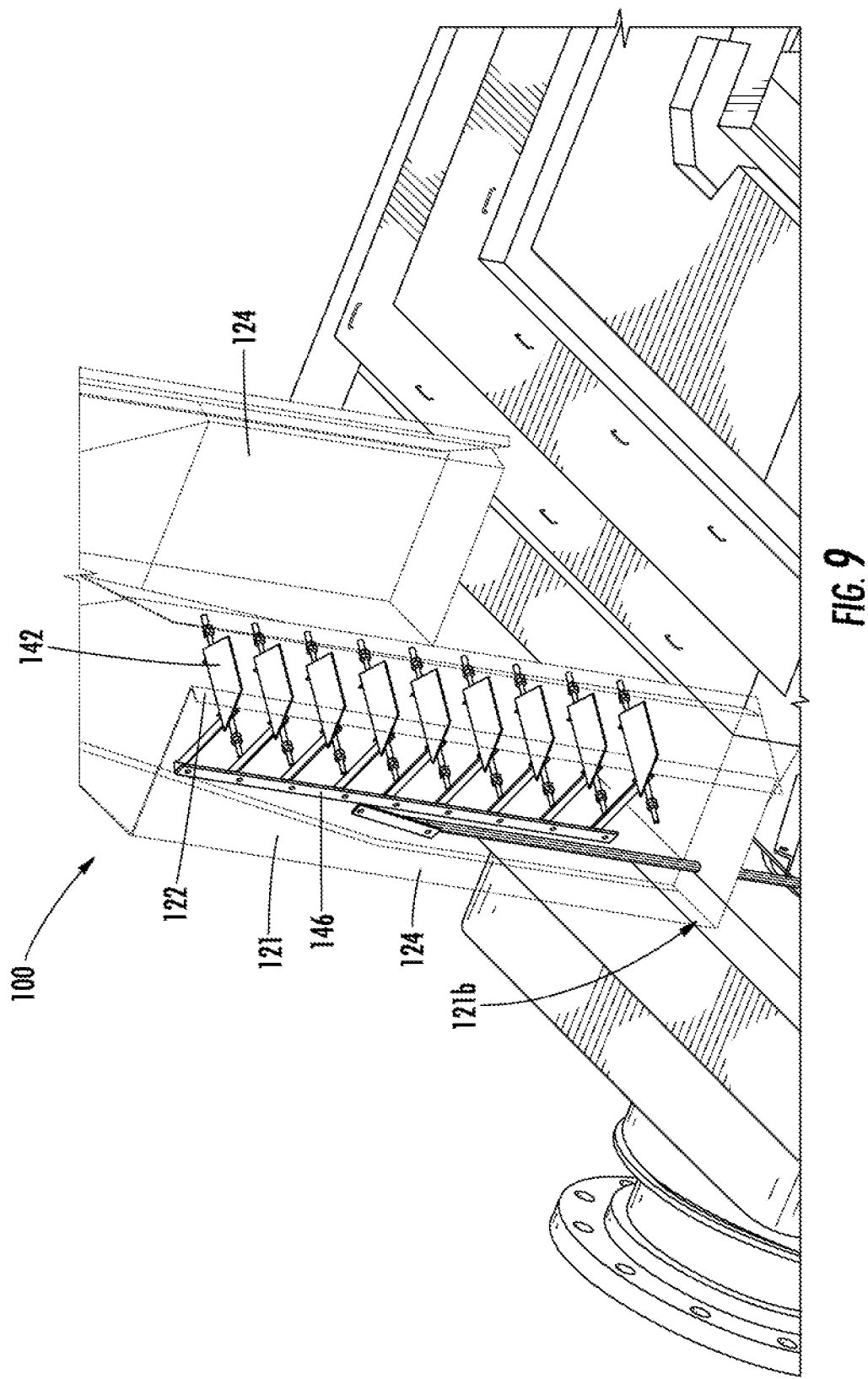
FIG. 9 is a partial perspective view of a lower duct hood having a plurality of vanes in a first orientation, according to an exemplary embodiment.
Figure 10:
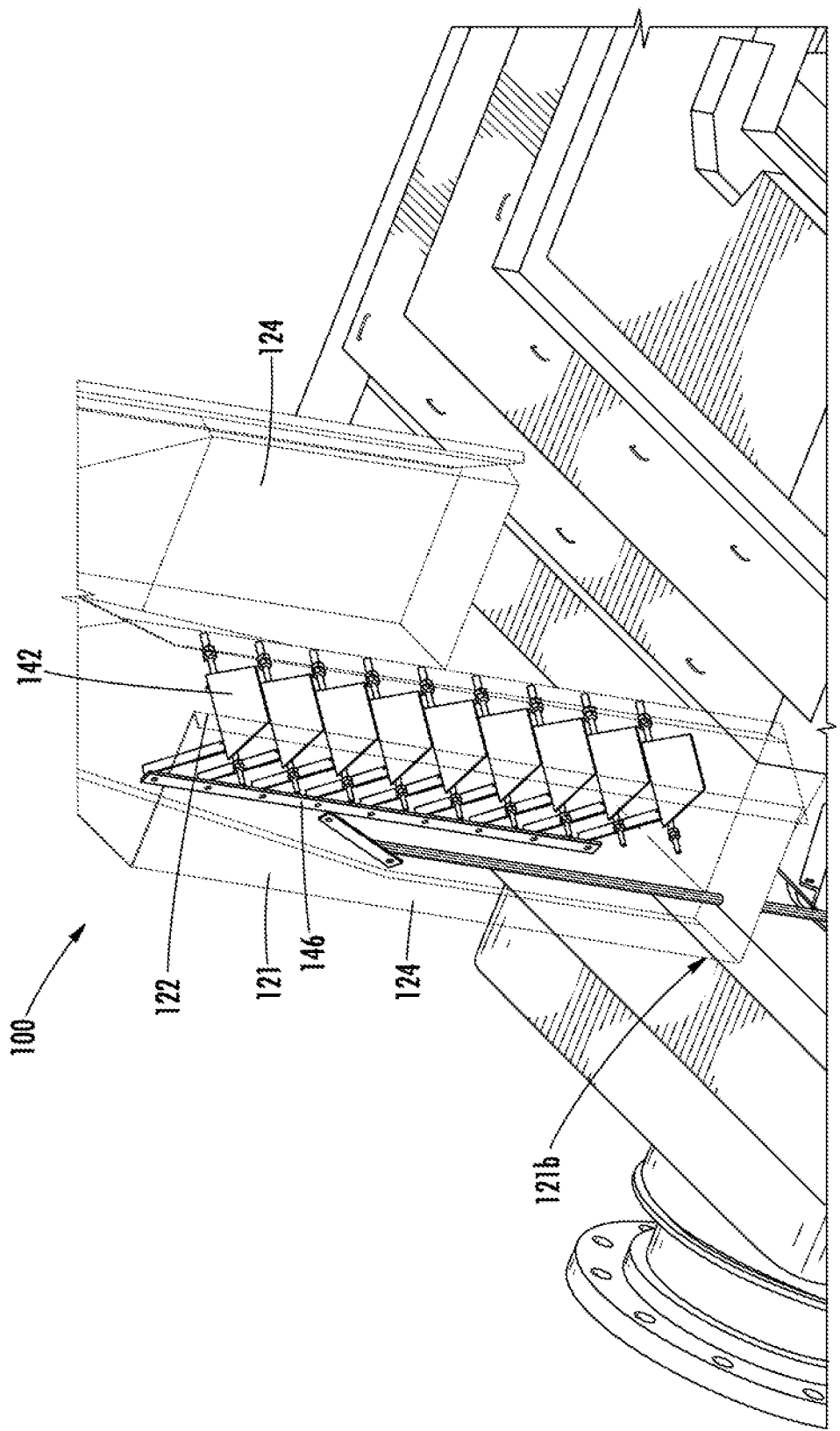
FIG. 10 is a partial perspective view of the lower duct hood having a plurality of vanes in a second orientation, according to an exemplary embodiment.

Referring now to FIGS. 8-10, the lower duct hood 120 further includes vanes 142 disposed at each outlet 122. As shown in FIG. 8, the vanes 142 may define at least a first plurality of vanes 144a and a second plurality of vanes 144b, each configured to articulate to direct the flow of the gas mixture to a designated vertical position along the fuel cell stack 10. The first and second pluralities of vanes 144a, 144b may be articulated in the same or different directions. According to an exemplary embodiment, the vanes 142 are configured to adjust the volume of the gas mixture flowing to different portions of a fuel cell stack 10. For example, the first plurality of vanes 144a may be directed generally downward, such orientation shown in FIG. 10, such that the supply of the gas mixture to an upper portion of the fuel cell stack 10 is restricted, thereby increasing the supply of the gas mixture to a lower portion of the fuel cell stack 10. Accordingly, the vanes 142 may be articulated to reduce the flow of the gas mixture to certain fuel cells 12 in order to reduce degradation of those fuel cells 12, improving even degradation throughout a fuel cell stack 10. According to another exemplary embodiment, the vanes 142 may be configured to control temperature at the inlet 11 of the fuel cell stack 10. The vanes 142 may be articulated to direct streams of hotter mixed gas away from hotter areas of the inlet 11 and toward cooler areas of the inlet 11.

According to an exemplary embodiment, each of the first and second pluralities of vanes 144a, 144b may be articulated such that the flow rate of the gas mixture can be controlled at certain heights of the outlet 122, providing a desired flow rate of the gas mixture to certain fuel cells 12 within the fuel cell stack 10, and reducing uneven degradation of the fuel cells 12.

Referring to FIGS. 8-10, each of the vanes 142 is pivotably coupled to the body 121. For example, a pin extends from either side of a vane 142 and engages the leg 124 at either side of the outlet 122, such that the vane 142 is configured to articulate about an axis defined by the pins. Each vane 142 is coupled to an articulating member 146. The articulating member 146 may be coupled to each of the vanes 142 in a given plurality of vanes 144a, 144b, such that all of the vanes 142 in the plurality of vanes 144a, 144b pivot at the same angle. The articulating member 146 may further be disposed within the body 121 of the lower duct hood 120 in order to maintain a desired electrical clearance from the fuel cells stack 10. As shown in FIG. 9, each of the vanes 142 is articulated in a substantially horizontal (i.e., open) position. As shown in FIG. 10, each of the vanes 142 is articulated in a substantially downward (i.e., closed) position. The vanes 142 may be articulated in many other orientations not shown. According to other exemplary embodiments, the vanes 142 may be separately (e.g., individually) controlled. According to other exemplary embodiments, the vanes 142 may be articulated in other ways (e.g., gear, pulley, electronic or hydraulic actuator, etc.). According to yet another exemplary embodiment, more or fewer pluralities of vanes 144a, 144b may be used, each articulated by its own articulating member 146.

The temperature of the gas mixture fed to the inlet 11 of the fuel cell stack 10 may be controlled, at least in part, in other ways. These other ways provide uniform degradation of fuel cells 12 in a fuel cell stack 10 by providing a uniform temperature and/or constituent gas species to each of the fuel cells 12 in the fuel cell stack 10. According to an exemplary embodiment, small amounts of water may be injected in the inlet 11, creating a cooler temperature region where the water is injected due to the rapid evaporation of the water. For example, the water may be injected by injection ports at various heights along the outlet 122 of the duct 100. The height of an injection port may be determined based on a temperature at a corresponding height in the fuel cell stack 10.

According to another exemplary embodiment, a plurality of baffles may be configured to direct the gas mixture to bypass cooler or warmer surfaces in the duct 100 and reintroducing the bypassed flow to the inlet 11 of the fuel cell stack 10.

According to another exemplary embodiment, at least one tube coil may be fed through the duct 100. Gas or liquid at a cooler temperature than that of the gas mixture in the duct 100 is fed through the tube coil, such that the tube coil acts as a heat exchanger. Heat is then transferred from the gas mixture to the gas or liquid passing through the tube coil, thereby cooling down the gas mixture. According to another exemplary embodiment, the at least one tube coil may be configured to move within the duct 100. The tube coil may be coupled to a mechanical linkage such that it can be repositioned in the duct 100 to provide cooling in a desired flow region of the gas mixture. The cooling gas or liquid may be fed to the tube coil through a flexible line. According to other exemplary embodiments, the tube coil may include other shapes or may be another form of heat exchanger.

According to another exemplary embodiment, at least one frictional heater may be positioned in the flow path of the gas mixture into the inlet 11 of the fuel cell stack 10. The at least one frictional heater is configured to locally heat a region of the gas mixture before being fed to the fuel cell stack 10. According to another exemplary embodiment, the gas mixture may be subject to metal oxidation, heating the gas mixture subject to the oxidation. The duct 100 or the inlet 11 of the fuel cell stack 10 may be configured to selectively perform metal oxidation to heat desired areas of the inlet 11.

According to another exemplary embodiment, hot and cold streams of the gas mixture may be separated by density. For example, each of the hot and cold streams may have different densities. The gas mixture may be guided in an arc, such that the hot and cold streams are separated based on momentum.

According to another exemplary embodiment, a reactive fuel gas may be locally injected in the gas mixture. The reactive fuel gas may react with the gas mixture, thereby modifying the composition of the gas mixture before being fed to the fuel cell stack 10, and producing a locally-heated stream. According to another exemplary embodiment, an acid and base pair may be locally injected in the gas mixture. The reaction between the acid and the base generates heat, producing a locally-heated stream. According to another exemplary embodiment, a plurality of secondary flow inlets (e.g., spargers) may be disposed proximate to inlet 11 of the fuel cell stack 10. The secondary flow inlets are configured to introduce a gas into the gas mixture such that the gas mixture is diluted or enriched to a desired composition (e.g., for the constituent gas species). The secondary flow inlets may be configured to adjust the temperature or composition at focused areas along the inlet 11 of the fuel cell stack 10.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A duct for a fuel cell module, the duct comprising:
    an upper duct hood having an inlet configured to receive reactant gas from a supply duct, the upper duct hood defining a first tapered portion and a second tapered portion downstream from the first tapered portion;
    a lower duct hood fluidly coupled to the upper duct hood, the lower duct hood including a first leg and a second leg, the first leg defining an outlet configured to output a gas mixture for use in a fuel cell stack, and the second leg being spaced apart from the first leg so as to provide access to the fuel cell module therebetween;
    wherein, in a side view, the second tapered portion is tapered inwardly in a downstream direction such that the second tapered portion reduces in size in the side view; and
    wherein, in a top view, the first tapered portion is tapered inwardly in a downstream direction; and
    wherein, in the top view, the second tapered portion is tapered outwardly moving downstream.

2. The duct of claim 1, wherein the second tapered portion defines a substantially constant cross-sectional area.

3. The duct of claim 1, wherein in the side view, the first tapered portion is tapered inwardly in a downstream direction.

4. The duct of claim 1 further comprising a sparger assembly configured to sparge air from an air supply and feed the air to the upper duct hood.

5. The duct of claim 4, wherein the sparger assembly includes an outlet configured to output the air at an angle offset from a direction of flow of reactant gas through the inlet of the upper duct hood.

6. The duct of claim 1 further comprising at least one plurality of vanes pivotably coupled to opposing sides of the outlet, the at least one plurality of vanes configured to direct the flow of the gas mixture.

7. The duct of claim 6 further comprising a first plurality of vanes and a second plurality of vanes configured to articulate independently from the first plurality of vanes.

8. A fuel cell module comprising:
    a plurality of fuel cell stacks, each fuel cell stack defining an inlet configured to receive a gas mixture; and
    a duct having an upper duct hood and a lower duct hood, the lower duct hood including at least one outlet;
    wherein the at least one outlet of the lower duct hood is fluidly coupled to a corresponding inlet of a corresponding fuel cell stack;
    wherein a first plurality of vanes is pivotably coupled to a first side of the outlet and a second plurality of vanes is pivotably coupled to a second side of the outlet independently from the first plurality of vanes such that the second plurality of vanes are configured to articulate independently from the first plurality of vanes, wherein the second side of the outlet is located opposite to the first side of the outlet, and wherein the first plurality of vanes and the second plurality of vanes are configured to direct the flow of the gas mixture to the inlet.

9. The fuel cell module of claim 8, wherein a gap is provided between the outlet of the duct and the inlet of the fuel cell stack, the gap configured to prevent electrical contact therebetween.

10. The fuel cell module of claim 8,
    wherein the lower duct hood includes two legs, each leg defining an outlet; and
    wherein each outlet is fluidly coupled to a corresponding fuel cell stack.

11. The fuel cell module of claim 8 further comprising two ducts;
    wherein the plurality of fuel cell stacks includes four fuel cell stacks, each duct configured to be fluidly coupled to two of the fuel cell stacks.

12. The fuel cell module of claim 8, wherein the outlet is substantially the same height as the inlet.

* * * * *

UNITED STATES PATENT AND TRADEMARK OFFICE
CERTIFICATE OF CORRECTION

| | |
|---|---|
| PATENT NO. | : 10,847,823 B2 |
| APPLICATION NO. | : 15/724736 |
| DATED | : November 24, 2020 |
| INVENTOR(S) | : Quatannens et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this
Thirty-first Day of January, 2023

Katherine Kelly Vidal
*Director of the United States Patent and Trademark Office*